(12) United States Patent
Torres

(10) Patent No.: US 10,670,382 B2
(45) Date of Patent: Jun. 2, 2020

(54) METHODS FOR THE REPAIR OF MOTOR VEHICLE BODIES USING BODY LINE TEMPLATES

(71) Applicant: Jaime Torres, American Canyon, CA (US)

(72) Inventor: Jaime Torres, American Canyon, CA (US)

( * ) Notice: Subject to any disclaimer, the term of this patent is extended or adjusted under 35 U.S.C. 154(b) by 268 days.

(21) Appl. No.: 15/913,813

(22) Filed: Mar. 6, 2018

(65) Prior Publication Data

US 2018/0259312 A1    Sep. 13, 2018

Related U.S. Application Data

(60) Provisional application No. 62/468,126, filed on Mar. 7, 2017.

(51) Int. Cl.
*G01B 3/14* (2006.01)
*B29C 73/24* (2006.01)
*B62D 25/16* (2006.01)
*B60R 19/02* (2006.01)

(52) U.S. Cl.
CPC ............... *G01B 3/14* (2013.01); *B29C 73/24* (2013.01); *B60R 19/02* (2013.01); *B62D 25/16* (2013.01)

(58) Field of Classification Search
CPC ....... G01B 3/14; G01B 13/205; G01B 13/206
USPC ......... 33/566, 600, 608, 562, 563, 1 G, 1 K, 33/1 BB
See application file for complete search history.

(56) References Cited

U.S. PATENT DOCUMENTS

| | | | | |
|---|---|---|---|---|
| 1,435,525 A * | 11/1922 | Edvard | .................... | G01B 3/14 33/562 |
| 2,621,367 A * | 12/1952 | Kish | ........................ | B28B 1/00 264/138 |
| 2,845,379 A * | 7/1958 | Bey | ......................... | B05C 17/06 156/222 |
| 3,076,231 A * | 2/1963 | Vertin | .................... | G09B 25/02 264/220 |
| 3,669,813 A * | 6/1972 | Andrea | .................. | B62D 65/00 425/470 |
| 4,291,467 A * | 9/1981 | Shultz, Jr. | ............... | B43L 13/22 33/561.2 |
| RE31,000 E * | 7/1982 | LeGrand | .................. | B21D 1/14 33/288 |
| 4,474,722 A * | 10/1984 | Martin | .................. | B62D 65/00 156/264 |

(Continued)

*Primary Examiner* — Christopher W Fulton

(57) ABSTRACT

The present invention provides methods for the manufacture of body line templates, and for the use of those templates to repair the body lines of motor vehicle body panels. The present invention improves body line repair by restoring body lines more precisely and in the fraction of time it would typically take. Templates are often used in the industry to cut and forge body panels or body panel pieces, but not for repairing body lines. The original pattern for a body line template is made from an undamaged, perfectly contoured panel, such as a quarter panel, door panel or fender. The body line templates are used as a guide to restore the original shape of the body line on a damaged body panel. The templates are also used as a guide to more easily perfect the body lines by manipulating the applied body filler. In this way, repair time can be reduced by fifty, or as much as seventy-five, percent.

4 Claims, 4 Drawing Sheets

(56) References Cited

U.S. PATENT DOCUMENTS

| | | | | |
|---|---|---|---|---|
| 6,120,365 A * | 9/2000 | Johnson | ............... | B24D 15/04 |
| | | | | 15/143.1 |
| 6,571,484 B2 * | 6/2003 | Hastilow | ............... | G01B 3/14 |
| | | | | 33/546 |
| 8,468,709 B2 * | 6/2013 | Akdeniz | ............... | B29C 73/24 |
| | | | | 33/563 |
| 2004/0065972 A1 * | 4/2004 | Palazzo | ............... | B29C 73/02 |
| | | | | 264/36.22 |
| 2011/0271476 A1 * | 11/2011 | Robideau | ............... | B05C 17/10 |
| | | | | 15/245.1 |

* cited by examiner

METHODS FOR THE REPAIR OF MOTOR VEHICLE BODIES USING BODY LINE TEMPLATES

CROSS REFERENCE TO RELATED APPLICATIONS

This application claims priority to U.S. Provisional Application No. 62/468,126 filed Mar. 7, 2017. The content of the above application is incorporated by reference in its entirety.

FIELD OF THE DISCLOSURE

The disclosure relates to motor vehicle body repair, and more specifically to the repair of damaged, motor vehicle body lines through the use of body line templates.

BACKGROUND

One of the most common repairs in the motor vehicle repair industry is the repair of damaged body panels. Body panels are single-piece components that form the exterior surface of a motor vehicle. Body panels are formed in distinct and precise shapes for function, aerodynamics and aesthetics. One common feature of body panels are their body lines, which are unique lines or edges. Modern motor vehicles have increasingly sharp and complex lines. Damaged body panels are hammered and pulled to restore their original shape; and/or new, custom-cut, panel pieces are welded to the damaged panel. Body filler is then applied and sanded to match the damaged area to the original surface. Damaged body lines are carefully and manually restored. The shapes of their edges and direction of their lines are recreated by eye. This is becoming increasingly difficult—nearly impossible—with the complexity of modern lines. The traditional method is a difficult, imprecise, labor-intensive and long process. A typical repair could take a single worker as much as eight hours.

What is needed therefore is a method to improve the ease, preciseness and efficiency in the repair of motor vehicle body panels and their associated body lines.

SUMMARY

The present invention provides methods for the manufacture of body line templates, and for the use of those templates to repair the body lines of motor vehicle body panels. These methods improve body line repair by restoring body lines more precisely and in the fraction of time it would typically take. Templates are often used in the industry to cut and forge body panels or body panel pieces, but not for repairing body lines. The original pattern for a body line template is made from an undamaged, perfectly contoured panel, such as a quarter panel, door panel or fender. The body line templates are used as a guide to restore the original shape of the body line on a damaged body panel. The templates are also used as a guide to more easily perfect the body lines by manipulating the applied body filler. In this way, repair time can be reduced by fifty, or as much as seventy-five, percent.

BRIEF DESCRIPTION OF THE DRAWINGS

The drawings described herein are for illustrative purposes only of selected embodiments and not all possible implementations and are not intended to limit the scope of the present disclosure.

DEFINITIONS

Body Line: a component of a body panel's design that is a unique line or edge that provides a utilitarian and/or an aesthetic function.

Body Line Template: a removable, repositionable and two-dimensional material that serves as a template of a body panel's body line. Templates may be used in the repair of body panels or in the manufacture of other templates.

Body Panel: a single-piece component that forms the exterior surface of a motor vehicle, often formed in distinct, curved and precise shapes for function, aerodynamics and aesthetics, such as quarter panels, door panels and fenders.

Filler: a pliable material, generally consisting of a polyester resin-based substance, that is combined with a hardening agent which cures the filler to a hardened, non-pliable state. For example, a commonly used filler is 3M™ Company's Bondo® body filler.

Finishing Mechanism: a mechanism which may be used to shape, smooth and otherwise finish the surface of body panels. For example, sanders are finishing mechanisms that smooth surfaces by abrasion with sandpaper.

Guide: a removable, repositionable and two-dimensional material that serves as guide in following body lines. Guides may be used, in conjunction with body line templates, in the repair of body panels and their associated body lines.

Reforming Mechanism: a mechanism which may be used to reform damaged body panels to their original shape, such as dent pullers.

Separated Portion: a portion of source material that is separated and removed during the creation of body line templates.

Source Material: a removable, two-dimensional material that is used to create a body line template.

DETAILED DESCRIPTION

Methods are disclosed for the precise and efficient repair of motor vehicle body panels and their associated body lines. Embodiments of the present invention may consist of three processes. First, a motor vehicle body line template is made from an undamaged, perfectly contoured panel, such as a quarter panel, door panel, or fender. Second, the body line template is used to recreate the body line when reforming a damaged panel. Third, the body line template is used to perfect the body line when manipulating applied filler. Several embodiments of the present invention are described in more detail in reference to the figures.

Creating Body Line Templates

Figure 1:
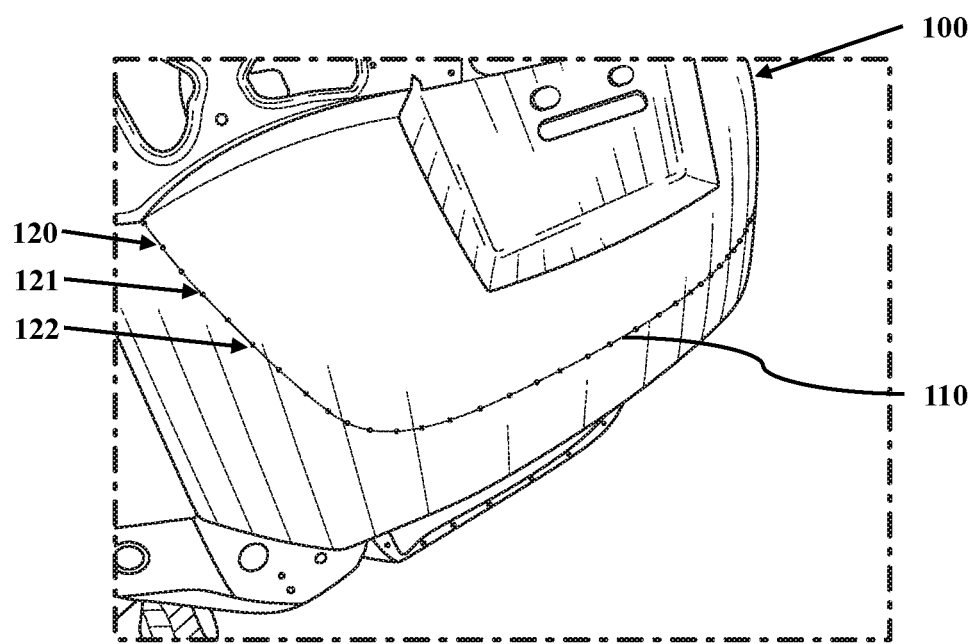
FIG. 1 is a view of a demarcated body line of an undamaged body panel, consistent with various embodiments.

Turning to FIG. 1, FIG. 1 is a view of a demarcated body line of an undamaged body panel, consistent with various embodiments. The undamaged body panel 100 is used to create a body line template for body line 110 associated with body panel 100. First, a pattern for a body line template is created by demarcating body line 110 of body panel 100. In some embodiments, body line 110 is demarcated with a series of dots, e.g., dot 120, dot 121 and dot 122. The dots are applied to body panel 100 along body line 110 using an impermanent felt-tip pen. Second, a guide is affixed on body panel 100 along the demarcated line, such as guide 340 in FIG. 3. In some embodiments, tape is affixed along the length of the series of dots, such as dot 120, dot 121 and dot 122.

Figure 2:
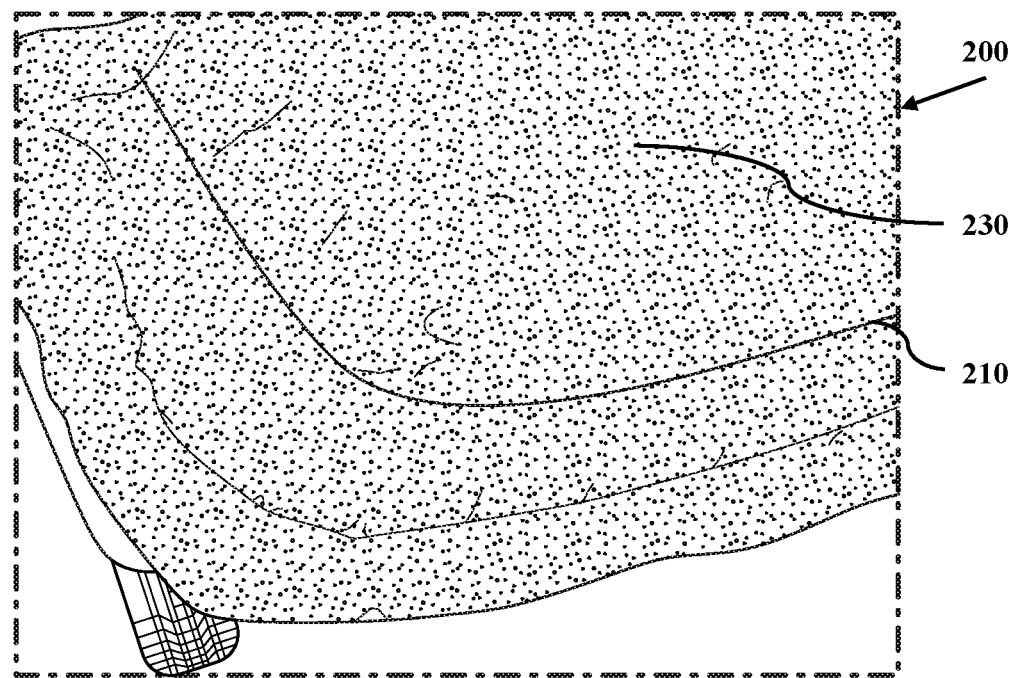
FIG. 2 is a view of an undamaged body panel, which has a pliable, penetrable and adhesive material affixed to the panel's exterior surface, consistent with various embodiments.

Turning to FIG. 2, FIG. 2 is a view of an undamaged body panel, which has a pliable, penetrable and adhesive material affixed to the body panel's exterior surface, consistent with various embodiments. In various embodiments, undamaged body panel 200 may be similar to body panel 100 of FIG. 1 and body line 210 may be similar to body line 110 of FIG. 1. A pliable, penetrable and adhesive, source material 230 is affixed to the exterior surface of an undamaged body panel 200, which has a previously-affixed guide along body line 210. Source material 230 will ultimately form the completed body line template. In some embodiments, source material 230 is 3M™ Welding and Spark Deflection Paper. Source material 230 is affixed to the entirety of the form of body panel 200. Body line 210 is demarcated on the affixed source material 230 along the length of a guide underneath, such as guide 340 in FIG. 3. In some embodiments, the markings are indentations made with a fine-pointed, blunt instrument. The indentions are carefully and repetitively traced along a guide marking body line 210 until source material 230 is separated along body line 210.

Figure 3:
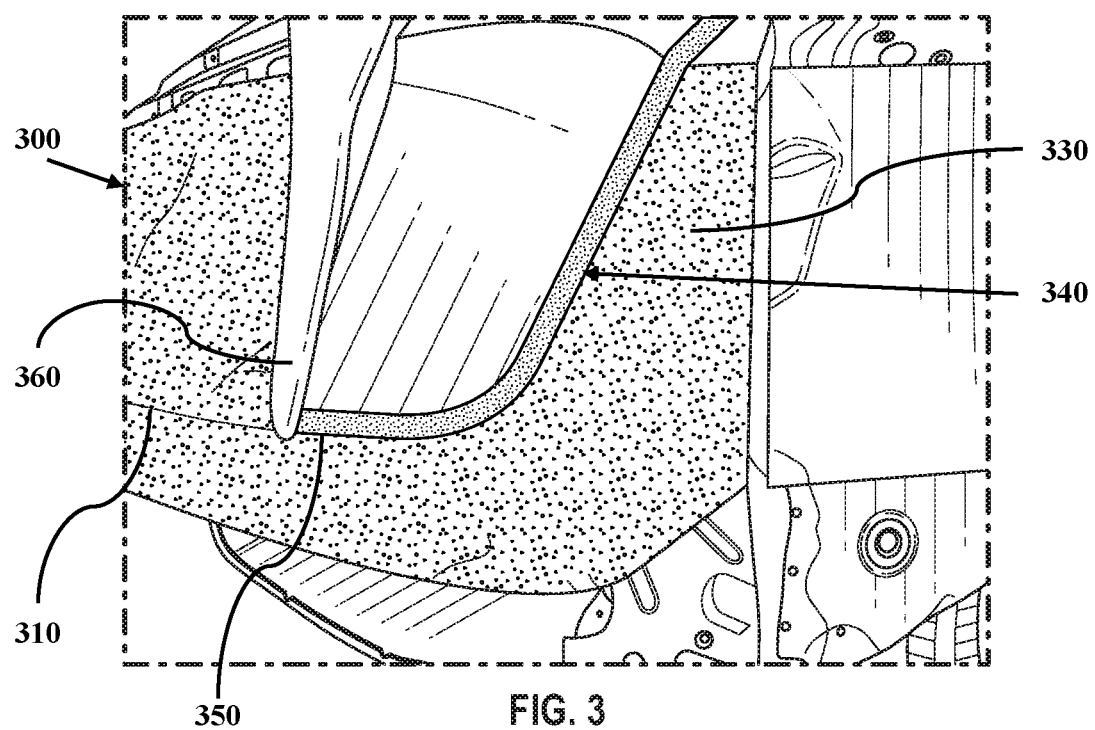
FIG. 3 is an illustration of the process of separating a material along a demarcated body line of an undamaged body panel, consistent with various embodiments.

Turning to FIG. 3, FIG. 3 is an illustration of the process of separating a material along a demarcated body line of an undamaged body panel, consistent with various embodiments. In various embodiments, undamaged body panel 300 may be similar to body panel 200 of FIG. 2, body line 310 may be similar to body line 210 of FIG. 2, and source material 330 may be similar to source material 230 of FIG. 2. A pliable, penetrable and adhesive, source material 330 was previously affixed to the entirety of the exterior surface of an undamaged body panel 300, which has a previously-affixed guide 340 along body line 310. In some embodiments, tape is used to create guides, such as guide 340. Indentions had been carefully and repetitively traced along guide 340, which marked body line 310. Source material 330 is separated along separation line 350, which follows body line 210. Separated portion 360 of source material 330 is removed from body panel 300.

Figure 4:
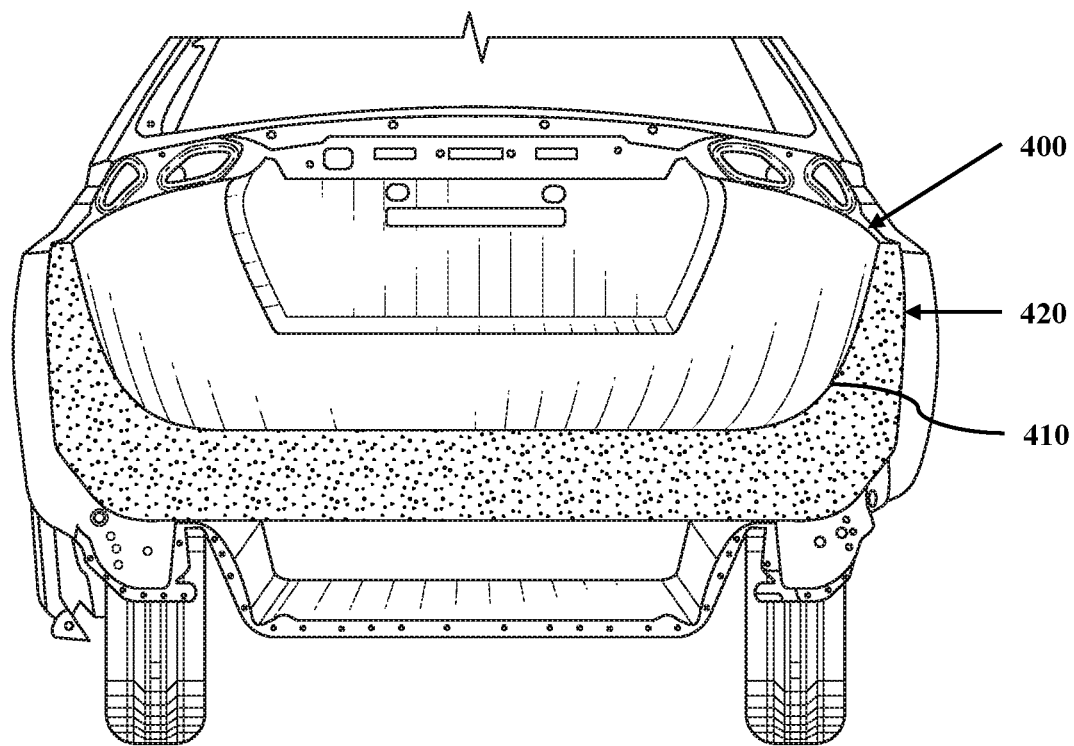
FIG. 4 is a view of a body line template affixed to an undamaged body panel from which it was created, consistent with various embodiments.

Turning now to FIG. 4, FIG. 4 is a view of a body line template affixed to an undamaged body panel from which it was created, consistent with various embodiments. In various embodiments, undamaged body panel 400 may be similar to body panel 300 of FIG. 3, body line 410 may be similar to body line 310 of FIG. 3, and body line template 420 may be similar to source material 330 of FIG. 3. Material, such as separated portion 360 of FIG. 3, had previously been separated along body line 410 and a separated portion of that material had been removed from body panel 400. The separated portion of the material that remains affixed to body panel 400 is the completed pattern for body line template 420. Body line template 420 may be used in the manufacture of templates for, and/or in the repairs to, this specific body line and body panel.

Recreating Body Lines when Reforming a Damaged Panel

Figure 5:
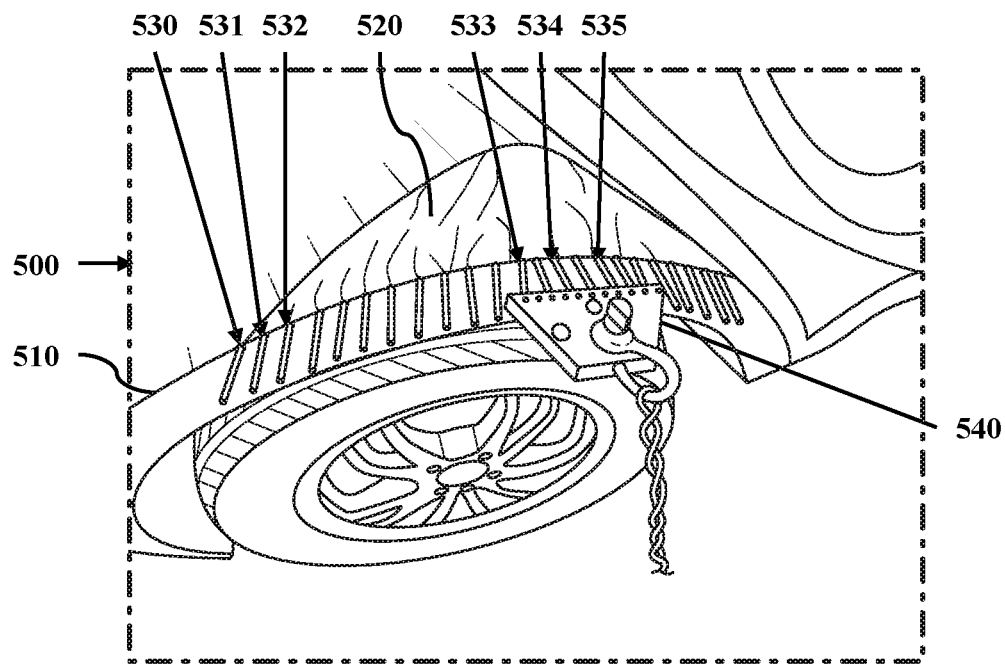
FIG. 5 is an illustration of a reforming mechanism situated along a line marked using a body line template, consistent with various embodiments.

Turning now to FIG. 5, FIG. 5 is an illustration of a reforming mechanism situated along a line marked using a body line template, consistent with various embodiments. The surface of the damaged portion 520 of body panel 500 is prepared for repair by removing the paint on the exterior surface of the body panel. A body line template, such as body line template 420 in FIG. 4 and which was created for body panels of this type, is affixed to a position on damaged body panel 500. In some embodiments, the body line template is premeasured and precut 3M™ Welding and Spark Deflection Paper. The desired body line 510 is demarcated on the damaged panel by tracing the edge of the affixed body line template. In some embodiments, an impermanent felt-tip pen is used to mark a line above and along the length of the template. The process of affixing a body line template to a position on body panel 500 and demarcating body line 510 by tracing the edge of the affixed body line template, may be repeated until the demarcation of body line 510 is complete.

A reforming mechanism is used to reform the body line along demarcated body line 510. In some embodiments, pulling mechanism 540 is used, in combination with a plurality of nails, to reform the body line. A series of nails are affixed along demarcated body line 510, such as nail 530, nail 531 and nail 532. Pulling mechanism 540 is attached to groups of nails, such as nail 533, nail 534 and nail 535, in sequence along body line 510. Pulling mechanism 540 is used to move the damaged portion 520 of body panel 500 into its undamaged position. Pulling mechanism 540, consistent with various embodiments, is attached to four nails at a time and pulled.

Figure 6:
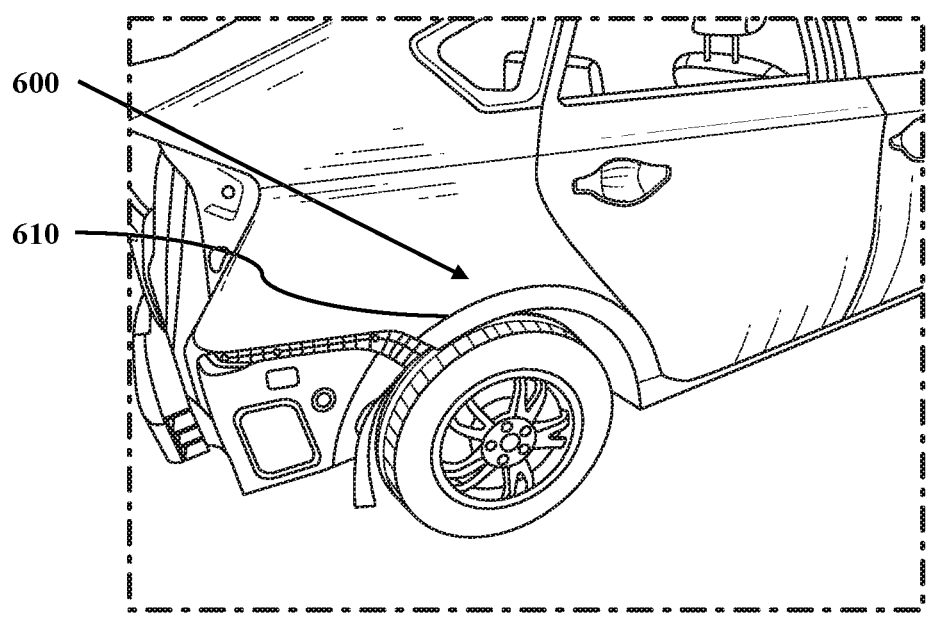
FIG. 6 is a view of a body panel and its body line after the panel and line have been reformed to their undamaged positions, consistent with various embodiments.

Turning now to FIG. 6, FIG. 6 is a view of a body panel and its body line after the panel and line have been reformed to their undamaged positions, consistent with various embodiments. In various embodiments, body panel 600 may be similar to body panel 500 of FIG. 5 and body line 610 may be similar to demarcated body line 510 of FIG. 5. A reforming mechanism, such as pulling mechanism 540 of FIG. 5, had been used to reform damaged body panel 600 so that body line 610 is in its original, undamaged position.

Perfecting Body Lines when Manipulating Applied Filler

Figure 7:
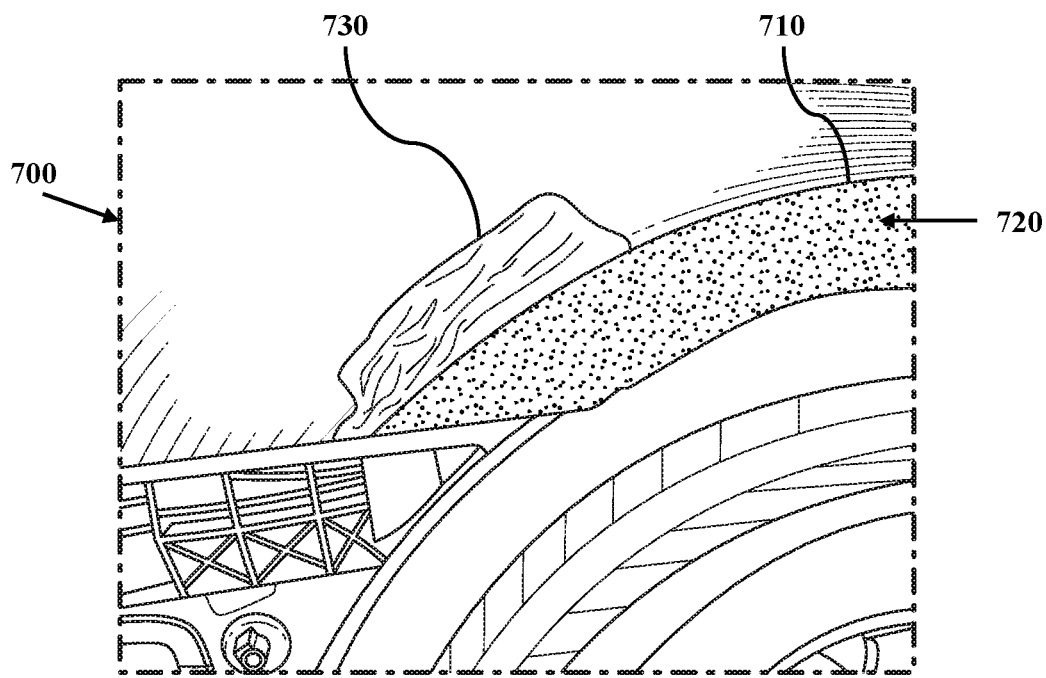
FIG. 7 is a view of a body line template placed on a reformed, damaged body panel after filler has been applied to that panel, consistent with various embodiments.
Figure 8:
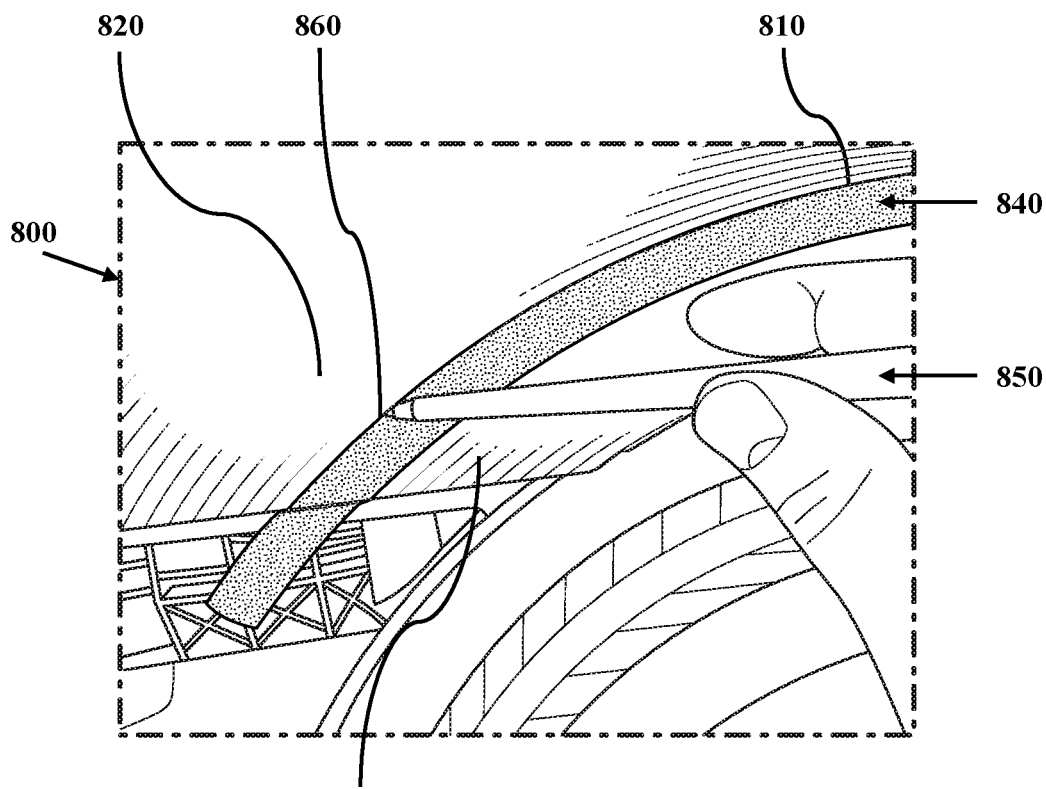
FIG. 8 is an illustration of using a guide, in conjunction with a body line template, to finish the surface of a body panel during its repair, consistent with various embodiments.

Turning now to FIG. 7, FIG. 7 is a view of a body line template placed on a reformed, damaged body panel after filler has been applied to that panel, consistent with various embodiments. In various embodiments, body panel 700 may be similar to body panel 600 of FIG. 6 and body line 710 may be similar to body line 610 of FIG. 6. Filler 730 is applied to the surface of a reformed, damaged body panel 700. After filler 730 has cured to the desired hardness, body line template 720 is affixed to body panel 700 on a position along body line 710. For example, body line template 720 may be positioned immediately above or, as illustrated in FIG. 7, immediately below body line 710. Body line 710 is demarcated on body panel 700 by tracing the edge of affixed body line template 720. In some embodiments, an impermanent felt-tip pen, such as pen 850 in FIG. 8, is used to mark a line above and along the length of body line template 720. The process of affixing body line template 720 to body panel 700 on a position along body line 710 and demarcating body line 710 by tracing the edge of the affixed body line template, may be repeated until the demarcation of body line 710 is complete. Body line template 720 is removed from body panel 700.

Turning now to FIG. 8, FIG. 8 is an illustration of using a guide, in conjunction with a body line template, to finish the surface of a body panel during its repair, consistent with various embodiments. In various embodiments, body panel 800 may be similar to body panel 700 of FIG. 7 and body line 810 may be similar to body line 710 of FIG. 7. Body line 810 had previously been demarcated on body panel 800 by tracing the edge of an affixed body line template, such as body line template 720 of FIG. 7. First guide 840 is affixed along the demarcated body line 810. In some embodiments, tape is affixed below the length of demarcated body line 810. In some embodiments, additional tape may be repetitively affixed directly on first guide 840 to further emphasize demarcated body line 810. That is because the finishing process might cause the marking and/or the guide to deteriorate.

A finishing mechanism is used to shape and smooth first area 820 of body panel 800 to its original shape and texture. In some embodiments, a sander may be used to abrade the filler above guide 840. The process of applying filler, such as filler 730 in FIG. 7, applying a body line template, such as body line template 720 in FIG. 7, demarcating a body line, such as body line 710, applying a first guide, such as first guide 840, and finishing a first area, such as first area 820, may be repeated until first area 820 is the desired shape and smoothness.

Turning back to FIG. 8, body line 810 is demarcated on body panel 800 by tracing the edge of affixed first guide 840. In some embodiments, an impermanent felt-tip pen, such as pen 850, is used to mark a line above and along the length of first guide 840. First guide 840 is removed. A second guide is affixed on first area 820 and along the demarcated body line 810. In some embodiments, tape is affixed above and along the length of first guide 840. In some embodiments, additional tape may be repetitively affixed directly on the second guide to further emphasize demarcated body line 810. A finishing mechanism is used to shape and smooth second area 830 of body panel 800 to its original shape and texture. In some embodiments, a sander may be used to abrade the filler below the second guide. The process of applying filler, such as filler 730 in FIG. 7, demarcating a body line, such as body line 810, applying a second guide, and finishing a second area may be repeated until the second area is the desired shape and smoothness. The second guide is removed.

The reformed body panel 800 and its associated body line 810 are now perfected and ready for the final painting process.

Although described in relation to the repair of a motor vehicle body, the present invention is equally applicable in the repair of other vehicles and other objects made of sheet metal.

Although the invention has been shown and described with respect to a certain preferred embodiment, it is obvious that equivalent alterations and modifications will occur to those skilled in the art upon reading and understanding the specification. The present invention includes all such equivalent alterations and modifications and is limited only by the scope of the claims.

REMARKS

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the invention. Accordingly, the invention is not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure in this specification are used to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing may be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Those skilled in the art will appreciate that the method steps discussed above may be altered in various ways. For example, the order of the steps may be rearranged, sub-steps may be performed in parallel, steps discussed may be omitted, other steps not discussed may be included, etc.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Furthermore, in the specification, figures and claims, reference is made to particular features (including method steps) of the invention. It is to be understood that the disclosure of the invention includes all possible combinations of such particular features. For example, where a particular feature is disclosed in the context of a particular aspect or embodiment of the invention, or a particular claim, that feature may also be used, to the extent possible, in combination with and/or in the context of other particular aspects and embodiments of the invention.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an article "comprising" (or "which comprises") components A, B and C may consist of (i.e., contain only) components A, B and C, or may contain not only components A, B, and C but also contain one or more other components.

Where reference is made herein to a method comprising two or more defined steps, the defined steps may be carried out in any order or simultaneously (except where the context excludes that possibility), and the method may include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Aspects of the disclosed invention may be embodied as a system, method or process.

Any element in a claim that does not explicitly state "means for" performing a specified function, or "step for" performing a specific function is not to be interpreted as a "means" or "step" clause as specified in 35. U.S.C. § 112 ¶6. Specifically, the use of "step of" in the claims herein is not intended to invoke the provisions of U.S.C. § 112 ¶6.

We claim:

1. A method of repairing a body line of a body panel using a body line template and a reforming mechanism comprising the steps of:
    affixing said body line template to a position on said body panel;
    creating a demarcation of said body line on a surface of said body panel using said body line template;
    positioning said reforming mechanism on said surface in conjunction with said demarcation;
    affixing said reforming mechanism to said surface; and
    reforming said body line using said reforming mechanism.

2. The method of claim 1 wherein the affixing step and the creating step are repeated in conjunction a plurality of times until the entirety of said body line is demarcated on said surface of said body panel.

3. A method of repairing a body line of a body panel using a body line template, a filler and a finishing mechanism comprising the steps of:
    applying said filler to said body panel;
    affixing said body line template to a position on said body panel;
    creating a first demarcation of said body line along said body line template on a surface of said body panel;
    removing said body line template;
    affixing a first guide along said first demarcation on said surface;
    finishing a first area along one side of said first guide with said finishing mechanism;
    creating a second demarcation of said body line along said first guide and on said first area;
    removing said first guide;
    affixing a second guide along said second demarcation and on said first area;
    finishing a second area along said second guide and opposite of said first area with said finishing mechanism; and
    removing said second guide.

4. The method of claim 3 wherein the affixing body line template step and the creating first body line demarcation step are repeated in conjunction a plurality of times until the entirety of said body line is demarcated on said surface of said body panel.

* * * * *